United States Patent Office 3,230,625
Patented Jan. 25, 1966

3,230,625

METHOD AND APPARATUS FOR SCORING SEMICONDUCTOR PLATES TO BE BROKEN INTO SMALLER BODIES

August Meyer, Munich, Germany, assignor to Siemens-Schuckertwerke Aktiengesellschaft, Erlangen, Germany, a German corporation Filed Nov. 16, 1962, Ser. No. 238,172
Claims priority, application Germany, Nov. 17, 1961, S 76,739
7 Claims. (Cl. 33—32)

My invention relates to a method and apparatus for scoring the surface of semiconductor discs, wafers or other plates of crystalline material for the purpose of subsequently breaking the plates along the score lines into a number of smaller semiconductor bodies for use in the production of transistors, rectifiers, photocells and other electronic semiconductor devices.

Such semiconductor plates are obtained, for example, by cutting them with the aid of a diamond saw from a monocrystalline rod of silicon, germanium, $A^{III}B^{V}$ semiconductor compound such as gallium arsenide, or other semiconductor substance. If necessary, the resulting discs, usually of circular shape, are thereafter subjected to lapping, etching or both in order to obtain a prescribed thickness. It has been proposed to provide such relatively large plates with scratch traces by means of a suitable scoring tool, such as a diamond, and to thereafter break the plates along the score lines into smaller bodies of the desired ultimate size and shape.

In principle, such scoring can be effected by hand, but then the attainable yield of small bodies having the desired accurate size and quality is often rather small.

It is an object of my invention to provide a method and means for scoring semiconductor plates at high accuracy and with the assurance that the resulting small-size products have substantially all the desired accurate dimensions and good qualities, while affording optimal utilization of the plate material.

Another object is to simultaneously produce such products in relatively large quantities.

In accordance with my invention, the production of the scratch or, score lines, preferably in a crisscross pattern on a number of semiconductor plates, is carried out by mounting the plate, or a number of such plates in substantially regular rows, on a suitable, preferably planar, support and pressing the scoring tool by stored force, preferably from a force-adjustable storing member such as a weight or spring against the plate surfaces at a substantially constant contact pressure of about 50 to about 200 grams, while passing the tool along the semiconductor surfaces at substantially constant speed between about 1 and about 5 cm. per second.

I have found that when scoring and subsequently breaking crystalline semiconductor plates of relatively large area a satisfactory output of useful products is reliably obtainable only if the crystalline character and extreme brittleness of the semiconductor substances is already taken into account when scoring the plates. In such crystalline or monocrystalline substances, differences in tension occur between different regions. This may cause fissures to develop at the surface as well as within the plate if the mechanical stresses during scoring are not kept within certain limits in the semiconductor material. Such danger of fissure formation, however, is prevented by performing the scoring operation in accordance with the above-mentioned features of the invention.

The constant force with which the scratching tool, for example a diamond, is pressed against the semiconductor surface, is preferably made adjustable for adaptation to the particular semiconductor material as well as to the thickness of the plate to be scored and subdivided. However, I have also found that it is simultaneously essential to observe a proper scoring rate as determined by the speed at which the scoring tool travels over the semiconductor surfaces. Apparently, this speed determines the rate with which any conditions of mechanical tension that may exist in the successively scratched portions of the surface or volume of the semiconductor plate, become sequentially released or eliminated. It has been ascertained, for example, that in this respect the scoring speed does not detrimentally affect the resulting products if this speed is not higher than about 5 cm. per second.

When the diamond or other tool arrives at the edge of a semiconductor plate about to be scored, an abrupt strain or shock is imposed, as a rule, upon the plate as well as upon the leading edge or tip of the tool. When the tool speed, under such conditions, exceeds a limit, the abrupt strain may likewise cause undesired longitudinal or transverse fissures in the semiconductor plate or may damage the tool. This is another reason why the observation of a limit for the scoring speed, in accordance with the invention as set forth above, is of advantage.

When the scoring tool, subjected to stored force for constant contact pressure, arrives at a semiconductor plate, some amount of lifting of the tool up to the top surface of the semiconductor plate will occur. Such lifting can readily take place because the tool is yieldable on account of the force storer effect. However, the lifting motion up to the height at which the force storer is loaded to the extent required for the contact pressure desired during scoring, is tantamount to transmitting a corresponding amount of potential energy to the tool and the force storer. This amount of energy being stored manifests itself also by a corresponding stress occurring at the edge of the semiconductor plates when the scoring is being commenced at a particular plate. It is therefore preferable, in accordance with another feature of my invention, to prevent the scoring tool from touching the supporting surface when passing from one to another semiconductor plate, and to thus keep the amount by which the tool is lifted at the edge of a plate to a given limit, up to which no damage will occur to the tool or the semiconductor plates when operating within the contact-pressure range and scoring rate specified in the foregoing. It has been found that for scoring monocrystalline plates of silicon by means of a diamond the lifting height of the diamond when running against the edge of a semiconductor plate should not exceed a value of about 50 microns.

The angle at which the scoring tool runs onto the semiconductor plates to be scored, is preferably kept rather small. In this manner the shock force upon the semiconductor plate and the tool can be reduced. It has been preferable, for example, to give a scoring diamond a cutting edge that forms an angle of approximately 16° with the vertical drawn upon the surface being scored. Accordingly, the angle formed by the edge of the scoring tool and the bottom of the trace being scratched should be between the limits of approximately 10 and 30°.

During scoring operation the semiconductor plates are to be fastened to the top surface of a supporting table or similar structure. It is preferable, however, to attach the semiconductor plates to a foil by pressing them lightly against an adhesively coated surface of the foil, and placing the plate-carrying foil upon the top surface of the rigid support. Such a foil may consist of synthetic plastic such as polyvinyl chloride. Due to its small thickness, for example 0.2 mm., the foil will lie snugly against the top surface of the rigid support while the scoring operation is in progress. Such a foil permits being readily clamped upon a supporting table and can also be tensioned between two opposite foil edges, or between the two pairs of edges, so as to be placed under tension, the semiconductor plates being attached to the foil between the clamping and tensioning locations. With such a mounting of the plates, the foil portions between adjacent plates constitute elastic members which can yield when the diamond or other scoring tool runs onto the top surface of a semiconductor plate. Thus the intermediate foil portions dampen any residual shock forces occurring when the tool hits against the edge of a plate.

In a scoring device according to the invention the tool is preferably driven by a continuously operating drive of normally constant but preferably adjustable speed to reciprocate across the rows of semiconductor plates mounted on the supporting structure. The scratching or cutting operation of the tool may then be performed only during a forward pass, and at the idle return stroke of the tool can be effected at a different and not necessarily constant speed. However, the device may also be designed to have the tool produce a scoring trace during forward and return strokes. This requires shifting the plate-carrying support one step after completion of each individual stroke of the tool. When thus utilizing the forward and return strokes of tool travel, the diamond or other scoring tool can be reversed 180° if one and the same cutting edge is to be active during both strokes. However, the diamond can also be so ground as to scratch traces during forward and return travel without requiring reversal in position.

According to another feature of my invention, I provide the scoring device with automatic control means which incrementally advance the plate-carrying support one step upon completion of each scoring pass so that a number of parallel scoring lines, equally spaced from each other, are automatically produced on a number of semiconductor plates. According to still another feature, the automatic control of the incremental shifting motion is made dependent upon the reversing or reciprocating tool drive so that the automatic advance of the plate-carrying support structure is discontinued when for any reason the scoring operation is terminated or discontinued by stopping the drive.

The above-mentioned and other objects, advantages and features of my invention, said features being set forth with particularity in the claims annexed hereto, will be apparent from, and will be set forth in, the following with reference to an embodiment and modification of a semiconductor-plate scoring apparatus according to the invention illustrated by way of example on the accompanying drawings in which:

Figure 8:
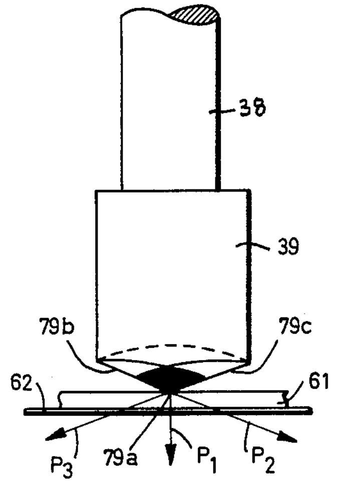
FIG. 8 shows separately the scoring tool of the apparatus in conjunction with a semiconductor plate being scored.
Figure 8A:
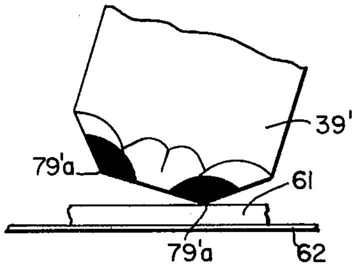

FIG. 8*a* shows the scoring tool of FIG. 8 modified with a second cutting tip.

Figure 7:
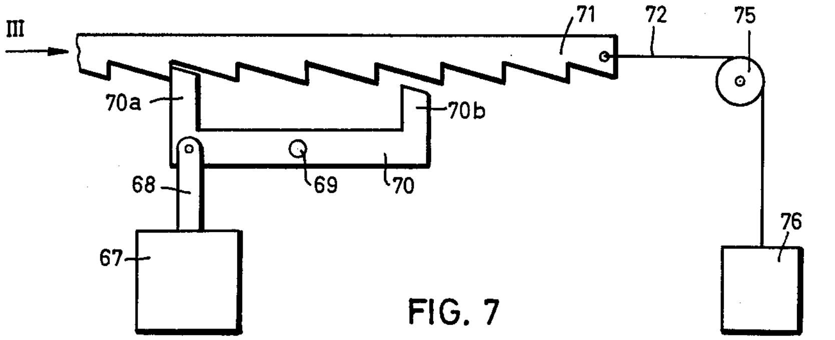
FIG. 7 shows a stepping mechanism for incremental advance of the plate-supporting table structure of the apparatus, the mechanism being shown from the left of FIG. 1 or FIG. 2.
Figure 9:
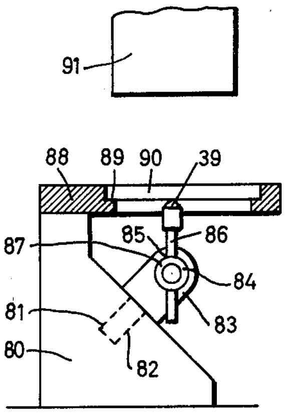
Figure 10:
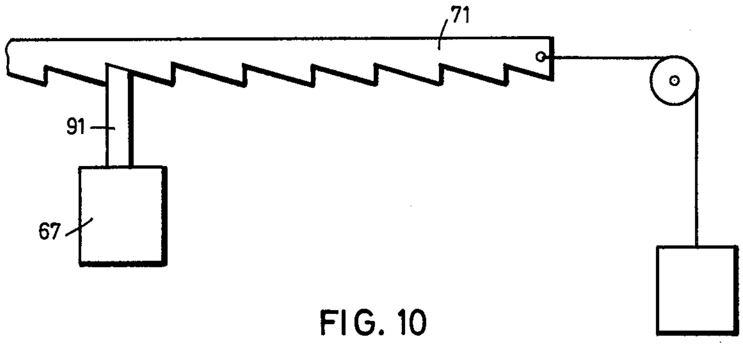

FIG. 9 illustrates partly in section an auxiliary device for accurately setting the scoring tool prior to inserting it into the scoring apparatus proper; and FIG. 10 shows a modified form of a stepping mechanism similar to that of FIG. 7.

Figure 1:
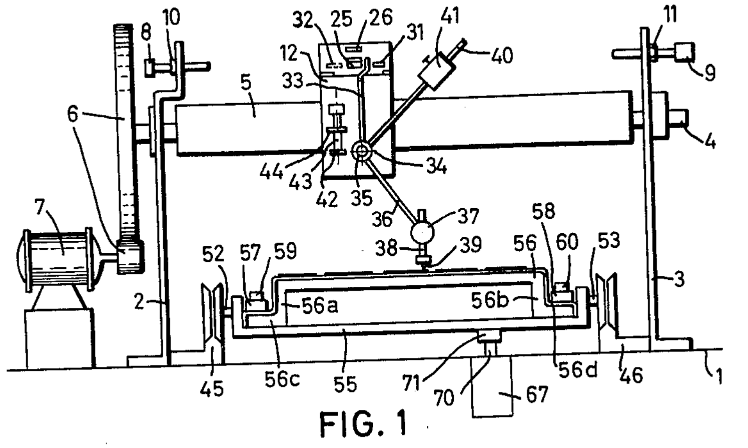
FIG. 1 is a front view and FIG. 2 a plan view of the scoring apparatus.
Figure 2:
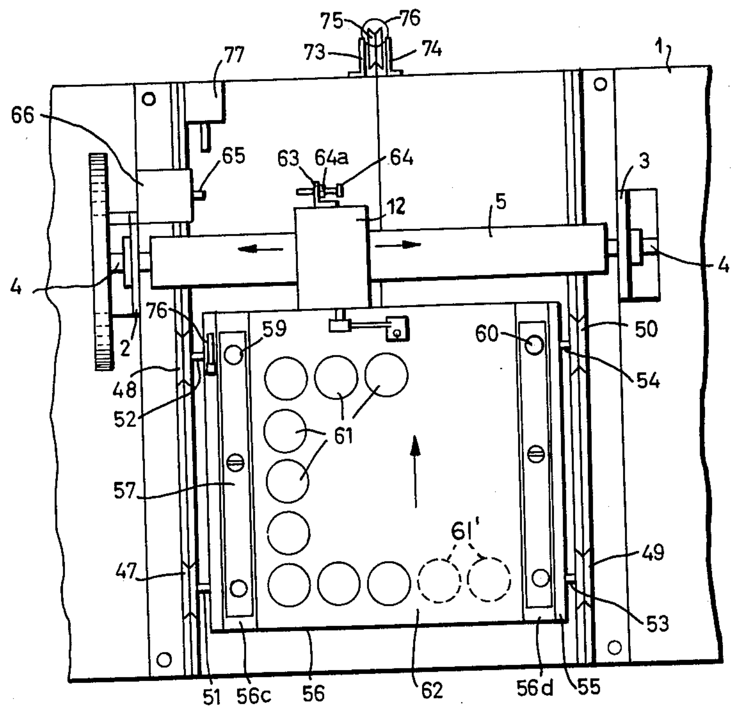

According to FIGS. 1 and 2, the base 1 of the apparatus carries two vertical standards 2 and 3 with respective bearings for the shaft 4 of an elongated cylinder 5 which, during operation of the scoring apparatus, is driven by a spur-gear transmission 6 from an electric motor 7 of constant speed. The standards 2, 3 carry adjustable stops, consisting of set screws 8 and 9, above the bearings for shaft 4. The set screws are secured in selected positions by means of lock nuts 10, 11. Seated on the elongated cylinder 5 is a carriage 12 with the scoring tool 39 such as a diamond. The tool carriage 12 is displaceable on the cylinder 5 between the limits determined by the stop screws 8 and 9.

Mounted on the top surface of the base 1 are two rails 45 and 46 of angular cross section. The shorter legs of the respective rails are engaged by the running wheels 47, 48 and 49, 50 of a carriage 55 to which the wheels are rotatably secured by means of respective axle pins 51, 52, 53 and 54. Inserted into the carriage 55 is a table-plate structure 56 of channel-shaped cross section. The two legs **56*a* and 56*b* of the channel section have lateral flange portions 56*c* and 56*d* respectively. Two clamping bars 57, 58 can be tightened against the respective flanges 56*c* and 56*d***.

The top surface of the table structure 56 constitutes the support for the semiconductor plates to be scored. For this purpose, a flexible foil 62 of synthetic plastic, for example polyvinyl chloride, is placed flat upon the table top and extends beneath the clamping bars 57 and 58. The exposed top surface of the foil is coated with adhesive. The semiconductor plates 61 are placed upon the foil and lightly pressed against it so that they become attached to the adhesive coating. The foil is fastened and tensioned by means of the clamping bars 57 and 58.

For producing a scratch trace, the tool carriage 12 is moved axially along the cylinder 5, thus passing the scoring tool 39 along a row of semiconductor plates, for example from the right to the left in FIG. 1. According to FIG. 3, the tool carriage 12 has two fixed journal pins 13 and 14 which protrude parallel to each other from the left side (FIG. 3) of the carriage, and hence toward the rear of the carriage as seen in FIG. 1. Each pin 13, 14 carries a roller 15, 16. The rollers engage opposite sides of a guide bar 17 fixedly mounted between the standards 2 and 3. In this manner the tool carriage 12 is prevented from rotating about the axis 20 of the cylinder 5 but is free to move axially along the cylinder.

Rotatably mounted on the tool carriage 12 is a friction roller 19 (FIGS. 3, 4, 5) which engages the peripheral surface of the cylinder 5. The roller axis 21 can be adjusted selectively to parallel or skewed positions with respect to the cylinder axis 20. The shaft 18 of the friction roller 19 is rotatably mounted in a fork 22 fastened to a pivot shaft 24 which is guided in a bearing 25 and rotationally adjustable about its axis 23. A helical compression spring forces the roller 19 into friction engagement with the cylinder 5.

When the axis 21 of roller 19 is set to a position parallel to the cylinder axis 20, the rotating cylinder 5 imparts to the roller 19 a rotating motion only, but no force component in the axial direction so that the carriage 12 remains at rest. When the axis 21 of the driven roller 19 is set to a skewed position relative to the cylinder axis 20, the roller 19 is not only rotated but is also subjected to a component driving force in the direction of the cylinder axis 20. This axial force is utilized for moving the tool carriage in one or the opposite direction along the cylinder 5. For this purpose, after the tool carriage 12 has moved the scoring tool in one direction over a row of plates 61 (FIGS. 1, 2), the position of the roller 19 is changed to reverse the travel direction of the carriage and return the tool to the starting position either before commencing another scoring pass or for producing a score line during the return stroke.

The motion of the tool carriage in the axial direction of the driving cylinder 5 is a function of the angle formed by the axis 21 of the driven roller 19 with the axial cylinder plane through the center point of the roller. If this angle is equal for both directions of travel, the speed of the carriage 12 resulting from a constant driving speed of the cylinder 5 is also the same in both directions. However, when the two angles for the respective traveling directions are unequal, the respective travelling speeds are correspondingly unequal. Consequently different travelling speeds for the two strokes of travel can be obtained in this manner. For example, the scoring tool can be driven at relatively slow speed in one direction over the semiconductor plates when the scoring operation is being performed, whereas the idle return motion of the tool is effected at relatively high speed.

Figure 5:
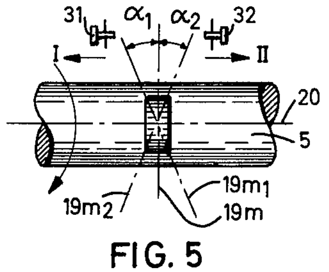

FIG. 5 represents schematically different positions of the driven roller 19. In one of the illustrated positions the roller axis 21 in the same plane as the axis 20 of the driving cylinder 5 so that the center plane 19*m* of roller 19 is perpendicular to the cylinder axis 20. In this position of the roller, the rotating cylinder 5 simply rotates the roller without displacing the carriage. Also indicated in FIG. 5 are two angles $\alpha_1$ and $\alpha_2$ of respective two center-plane positions 19$m_1$ and 19$m_2$ of the roller 19 for driving the tool carriage 12 in the opposite directions indicated by arrows I and II respectively.

Figure 6:
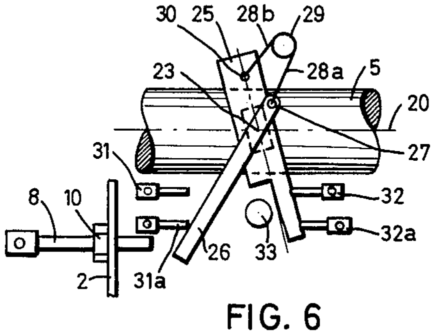
FIG. 6 is another top view corresponding to that of FIG. 5 showing the same detail in conjunction with other parts of the apparatus.

The control of the roller 19 for setting it from one to the other angular position is effected by means of a lever 25 (FIG. 6) which is rigidly secured to the end of the shaft 24 (FIG. 4) to be rotatable together with the roller 19 about the pivot axis 23. Also seated on the end of the pivot shaft 24 but rotatable relative thereto is a lever 26 (FIG. 6) whose angular limit positions are determined by adjustable stops 31*a* and 32*a* mounted on the tool carrier 12 (FIGS. 6, 5, 1). The forward end of lever 26 cooperates with the stationary limit stops 8 and 9 (FIGS. 6, 1).

Thus, in FIG. 6, the lever 26 is shown close to the stop 8 fastened on the standard 2 and secured in position by nut 10. The opposite end of the double-armed lever 26 has a hole engaged by one end 28*a* of a V-shaped spring 29 whose bight portion may also comprise a number of helical turns. The other end 28*b* of spring 29 engages a hole 30 in the rear arm of the double-arm lever 25. The stops 31 and 32 on carriage 12 (FIGS. 6, 5) for limiting the angular movement of lever 25 about the axis 23 are likewise adjustable.

Referring to FIG. 6, assume that the carriage is travelling toward the stationary stop 8. Spring 29 holds the lever 25 in the illustrated position against stop 32. As soon as the forward end of lever 26 hits against the stop 8 at the end of the scoring pass, the lever 26 is turned counterclockwise about axis 23. The lever 25 at first retains its position, so that the spring 29 is additionally stressed. As soon as the counterclockwise motion of lever 26 has progressed to the point where the longitudinal axis of lever 26 passes through the dead center position determined by the geometric line between points 30 and 23, the spring 29 commences to perform a snap action which turns the lever 25 clockwise about the axis 23 until the forward end of lever 25 abuts against the stop 31 and the forward end of lever 26 rests against the stop 32*a*. In this condition the snap-action device is prepared for the next operation to take place after the carriage has travelled to the other end of its path. The snap action of lever 25 and hence of shaft 24 causes the driven roller 19 to be reset. Consequently, if previously the angle $\alpha_1$ was effective (FIG. 5), the drive is now set in accordance with angle $\alpha_2$ so that, while the driving cylinder 5 continues to be rotated at constant speed, the roller 19 is caused to impart to the tool carriage a travelling motion in the reverse direction as indicated by the arrow II in FIG. 5.

Figure 3:
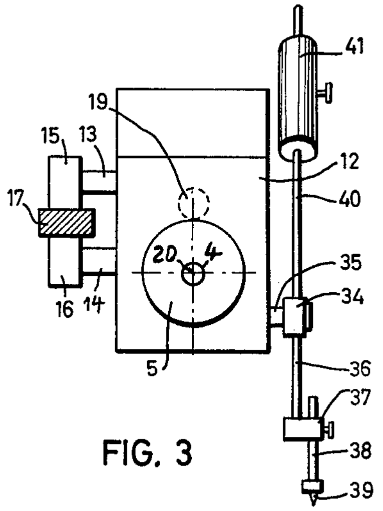
FIG. 3 illustrates a tool-holder carriage that forms part of the apparatus, the carriage being seen from the left of FIG. 1.
Figure 4:
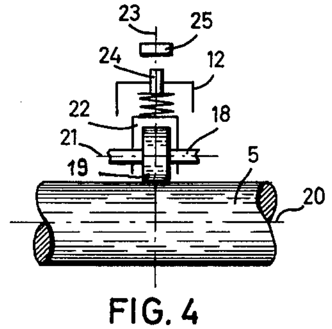
FIG. 4 shows schematically a front view and FIG. 5 a corresponding top view of a detail of the apparatus.

During clockwise displacement of the lever 25 under the action of spring 29, the forward end of lever 25 acts upon the upper end of a lever 33 (FIGS. 6, 1) fastened on a hub 34 which is rotatable on a shaft 35 (FIGS. 1, 3). The shaft 35 is secured to the right-hand side of the carriage 12 relative to FIG. 3, corresponding to the front of the carriage 12 as shown in FIG. 1. Also fastened to the hub 34 is an arm 36 whose end carries a clamping device 37 for fastening the holder rod 38 of the diamond or other scoring tool proper (FIGS. 1, 3, 8). Also secured to the hub 34 is a rod 40 with a weight 41. The weight can be secured in a selected radial distance from the hub 34 and serves as an adjustable force storer. If desired, however, the weight 41 can be replaced by a force-storing spring, for example a helical spring wound about the shaft 34. The hub 34 further carries a radially protruding stub arm 42 for coaction with a stationary limit stop 43 adjustably mounted on a holder 44 fixed to the carriage 12. The stop arm 42 together with the adjustable stop 43, such as a set screw, limit the clockwise motion of the hub 34 about the pivot shaft 35. The stop 43 thus permits adjusting for the tool 39 and hence relative to its cutting tip or edge, a desired lower limit position with respect to the top surface of the table structure 56 (FIG. 1). The lever 33, when acted upon by the lever 25 according to FIG. 6, turns counterclockwise (FIG. 1) about the shaft 35 so that the arm 36 likewise moves counterclockwise and lifts the scoring tool 39 a corresponding amount.

As mentioned above, when the carriage 12 approaches its left-hand limit position, the driven roller 19 is positionally reset so that the carriage reverses its travel from direction I to direction II as indicated in FIG. 5. When the angle $\alpha_2$ is larger than the angle $\alpha_1$, the return travel of the carriage 12 from the left to the right (relative to FIGS. 1, 2) takes place at a higher speed than the scoring pass from the right to the left.

The carriage 12 is provided with a further stop 64 (FIG. 2) in form of a set screw screwed into an angular member 63 and fastened by a counter nut 64*a*. As soon as the tool carriage 12 has about reached its left limit of travel, the stop 64 acts upon the actuating member 65 of a stationarily mounted electric switch 66. The switch controls the excitation of a magnet 67 (FIG. 7) which then moves a pull rod 68 downwardly. This controls a U-shaped pawl lever 70 pivotally rotatable about a pin 69 and cooperating with a rack 71 fastened to the bottom side of the plate-supporting carriage 55 (FIG. 1). Attached to the end of the rack 71 is a string 72 passing over a guide roller 75 journalled between bearing angles 73, 74 (FIGS. 2, 7). Fastened to the other end of the string to serve as a source of mechanical force is a weight 76. This weight may consist of a selected number of discs for the purpose of adjusting the total amount of driving force.

The weight 76 imposes a continuous pulling force in the direction of the arrow III (FIG. 7) upon the rack 72 and hence upon the plate-supporting carriage 55, but the carriage is normally stopped by a leg 70*a* of pawl 70 engaging a tooth gap of the rack 71. When at the end of a scoring pass the electric switch 66 is actuated by the stop 64 (FIG. 2), the magnet 67 turns the pawl 70 and releases the rack 71 for motion in the direction of the arrow III (FIG. 7). However, the other leg 70*b* of the pawl is normally located a distance of one-half of the tooth division ahead of the next steep tooth flank. Consequently, the pawl leg 70*b* permits the rack 71 to be advanced only one-half tooth division. When thereafter the pawl is turned clockwise back to the starting position, for example under the effect of a return spring after the magnet 67 is deenergized, the engagement of leg 70*b* with rack 71 is released only after the leg 70*a* is already engageable with the rack, so that the rack can now perform no more than another one-half step of travel until the pawl 70 resumes, relative to the rack 71, the same starting position as shown in FIG. 7.

The tooth division of the rack 71 determines the spacing between the parallel score lines successively cut into the surfaces of the semiconductor plates 61. If scoring traces of different mutual spacing are to be produced, the rack 71 is to be exchanged for a rack of correspondingly different tooth division. It is therefore preferable to fasten the rack 71 to the plate-supporting carriage 55 in such a manner as to readily permit an exchange.

The stepping mechanism shown in FIG. 10, simplified in comparison with the one according to FIG. 7, can be used in lieu of the one described above. According to FIG. 10, a single movable armature member 91 of the magnet or solenoid 67 acts directly upon the rack 71, the device being otherwise as described with reference to FIG. 7. The simplified mechanism, however, requires more careful adaptation because it is based upon utilizing the inertia resulting from the motion of masses when advancing the plate-supporting table structure 55. The electromagnet 67 in a stepping device according to FIG. 10, pulling the pawl member 91 downwardly in opposition to spring force, must have such a short interval of operation that the rack 71 being accelerated by the weight 76 can travel only such a short distance that the pawl 91 is already returned to latching position before the next tooth flank arrives at the pawl. With such an operation each electric control pulse supplied to the magnet 67 releases the advancing motion of the rack 71 only for one tooth division.

According to FIG. 2, the plate-supporting table structure 56 is provided with an adjustable stop 76 which acts upon an electric limit switch 77 fixedly mounted on the base 1. The switch 77 is actuated as soon as the table structure 55 reaches a position in which all semiconductor plates 61 are provided with parallel score lines in one direction. The stop 76 is preferably also an adjustable set screw that can be fixed in position by means of nuts. For a greater range of adjustability, a sleeve of suitable length can be screwed upon the end of the set screw, for example if one or more rows of semiconductor plates are not being scored at a time or if the corresponding table-top area is not occupied by plates. The limit switch 77 is connected in the energizing circuit of the motor 7 in order to stop the motor when actuated.

It is preferable to provide for accurate adjustability or calibration of the table-top surface on supporting structure 56 with respect to the base 1 of the apparatus in order to make certain that all score lines cut into the semiconductor plates have uniform depth at substantially all locations. Such a height adjustment and calibration can be obtained, for example, by giving the axle pins 51 to 54 of the running wheels carrying the table carriage 55 eccentric portions which are inserted into corresponding bores of the carriage structure. Then the height calibration can be effected simply by turning the axle pins about their respective axes and fastening them in proper position relative to the carriage structure. When the carriage or table structure is supported at four points as is the case in the illustrated embodiment, it suffices to provide for the just-mentioned adjustability at only three of the supporting points in order to permit giving the table top the desired accurate adjustment.

When using the above-mentioned carrier foil 62 (FIG. 2) for adhesively attaching the crystalline semiconductor plates 61, I have found it to be of advantage to employ a transparent foil material and to provide the table top of the carrier structure 55, upon which the foil is clamped, with markings 61' indicating the peripheries of the plates to be placed upon the foil surface. This facilitates giving the plates 61 according to FIG. 2 a desirable row-by-row arrangement at which the available foil surface is economically utilized. If desired, the table top can thus be provided with respectively different markings corresponding to semiconductor plates of respectively different diameters.

While in the foregoing, reference is made generally to semiconductor plates 61, it should be understood that these plates need not necessarily consist of crystalline semiconductor material exclusively. The plates may already be equipped with diffusion- or alloy-bonded electrodes and, as the case may be, with additional terminal or connector electrodes or corresponding metal coatings. It may then become advisable to take care that the scoring tool to be used in a particular case has its cutting edge designed in accordance with the particular type of plates to be scored. However, as shown in FIG. 8*a*, one and the same scoring tool 39' may also be provided with respectively different cutting edges **79'*a* and 79''*a*** so that it need only be fastened on its holder in the properly chosen position in order to selectively employ the one cutting edge suitable for the type of semiconductor plates to be scored.

For the same purpose, the device may also be provided with a tool holder of the turret or revolver type as generally known for machine tools, so that the turret need only be properly positioned in order to place the one scoring tool into operative position that is to be used for a particular scoring job. Also for such purposes, a single scoring tool can be given a plurality of cutting edges successively applicable for scoring operation, for example after one of these edges has become worn during scoring operations. The cutting edges of such a tool may follow each other in the peripheral direction of the tool so that it is only necessary to change the angular position of the tool with respect to the tool carriage in order to place the selected cutting edge into active position.

It has also been found preferable to give the cutting edge of the scoring tool such a shape that its exerts at the scoring location upon the body of the semiconductor plate a mechanical pre-stressing action that promotes the subsequent breaking of the plate at this locality. Such a favorable pre-stressing effect is achieved by positioning the tool flanks at the cutting edge relative to each other at an angle of more than 90° in a plane perpendicular to the cutting direction. As a result, the pressure with which the scoring tool is forced against the semiconductor plate during cutting operation, constitutes the resultant diagonal of a force parallelogram whose two force components, in a plane perpendicular to the cutting direction, represent respective pressure forces that are directed away from the trace being cut and are larger than the pressure force with which the tool is urged against the plate. The pre-stressing effect is particularly favorable when the semiconductor plate is supported on a somewhat expansible carrier as constituted by the above-mentioned foil of synthetic plastic. For example, the just-mentioned edge angle has been found to be favorable if given a size of 110 to 150° when scoring and subsequently breaking monocrystalline plates of silicon.

An embodiment of a tool embodying the cutting-edge features just discussed is shown in FIG. 8. The tool 39 consists of a diamond acting upon a semiconductor plate 61 adhesively attached to a foil 62. The two lateral flanks **79*b* and 79*c* intersecting at the cutting tip 79*a* of the tool define together an angle of about 140°. The force conditions can be represented by a force parallelogram whose resultant is constituted by the contact pressure $P_1$ with which the tool 39 is pressed against the plate 61 in the direction perpendicular to the plate surface. The resultant $P_1$ determines two force components $P_2$ and $P_3$ in the planes of the respective flanks. Each of these components can be considered to be a resultant of two sub-component forces of which one is directed perpendicularly to the force $P_1$ and to the direction of the trace being cut, while the other is directed away from the cutting trace and exerts its effect laterally into the crystalline body of the semiconductor plate 61**. In this manner, the scoring operation produces a pre-tensioned condition on both sides of each scoring line within the body of the semiconductor plate on the opposite sides respectively of the score line, whereby the subsequent breaking of the plate along the score line is promoted.

For scoring work of particularly high quality it is advisable to correctly prepare or adjust the cutting edge or tip of the scoring tool in an auxiliary device before inserting the tool into the tool carriage of the scoring apparatus proper. It is then necessary that the tool, after being adjusted in the auxiliary device, will correctly assume the corresponding position in the tool carrier of the scoring apparatus. For that reason the scoring tool is preferably attached to an intermediate carrier on which it can be positionally adjusted and calibrated in the auxiliary device and which has a suitable mating fit in the auxiliary device matching a corresponding fit in the scoring apparatus proper. Thus, for example, the intermediate holder may be provided with a prismatic or squared pin by means of which the intermediate carrier is inserted into a holder of the auxiliary device on the one hand, and thereafter into a corresponding holder of the scoring apparatus, on the other hand.

An auxiliary device of the type just mentioned is shown in FIG. 9. It comprises a rigid standard 80 with an opening 81 of square cross section. Inserted into the opening 81 is a prismatic pin 82 of a mating, square cross section. The pin 82 forms part of an intermediate carrier 83 for the scoring tool to be adjusted. The intermediate carrier 83 has a bore extending perpendicular to the plane of illustration. Tightly inserted into the bore is a holder 84 whose rear end, located behind the carrier 83, is threaded and carries a nut (not visible in FIG. 9) which, when being tightened, pulls the holder 84 into the bore of carrier 83. The holder 84 has a diagonal bore into which the rod-shaped carrier 86 of the diamond 39 is inserted. When the holder 84 is clamped in the carrier 83 as described above, the rod 86 is simultaneously clamped fast by being pressed against the front of the carrier 83. The standard 80 carries a horizontal frame 88 with a transparent plate or glass pane 90. The top surface of the pane 90 is marked by a hair line parallel to the plane of illustration and corresponding to the travel path of the cutting edge in the scoring apparatus. The distance between the horizontal axis of holder 84 and the lower surface of pane 90 corresponds to the position of the diamond tip relative to the same axis of holder 84 in the scoring machine. Mounted above the pane 90 is an optical magnifying system 91 with the aid of which the edge of the diamond 39 can be accurately positioned and aligned with respect to the hair line on the surface of plate 60.

After in such an auxiliary device the position of the tool edge is properly adjusted, the tool assembly comprising the parts 39, 86, 85, 84, 83 and 81 is removed from the auxiliary device and the square pin 82 is inserted into the corresponding opening in the tool carrier of the scoring apparatus proper.

As mentioned, the position of the table structure 56 with foil 62 is changed on the supporting carriage 55 (FIGS. 1, 2) after all scoring lines in one direction are produced, in order to then commence scoring the lines in the other direction. This positioning of table structure 56 is preferably effected after the supporting carriage 55 is moved to a most forward position by means of a handle (not shown) while temporarily unlatching it from the stepping mechanism previously effective to advance the supporting carriage. In the most forward position the supporting carriage is then latched until after the table structure is placed into the new position. Thereafter the supporting carriage is then shifted to the starting position where, after starting the tool drive, the first scoring trace in the new direction is cut into the surface of the semiconductor plates.

If the scoring apparatus is to be used for producing small semiconductor bodies of rectangular rather than square shape, the advancing steps of the supporting carriage in one direction must be larger than in the other direction. This requires changing the rate of advance when setting the apparatus from scoring in one direction to scoring in the other direction. It is preferable to provide for such change in advancing increments by a simple adjusting operation. Applicable for this purpose, for example, are the provision of two different rack-type stepping drives as described above with reference to FIG. 7, so that respectively different tooth divisions are in operation for scoring operations in the respectively different directions. If desired, the control of the differently large advancing steps of the supporting carriage can be effected by one and the same control magnet. For this purpose, the magnet can be selectively coupled with the locking pawl member of one or the other rack by electrical or mechanical switching. If desired, however, a complete control system may be provided for each of the respectively different advancing steps. This requires that the proper electric control circuit of one or the other of the electromagnets be switched into operation when changing the scoring direction.

While in the foregoing reference is made to the preferred use of a diamond as a scoring tool, other suitable tool materials, such as steel, capable of producing scratch traces on the particular semiconductor material, can be employed.

To those skilled in the art it will be obvious, upon a study of this disclosure, that such and other modifications are readily applicable and that my invention can be given embodiments other than particularly illustrated and described herein, without departing from the essential features of the invention and within the scope of the claims annexed hereto.

I claim:

1. The method of scoring silicon and germanium semiconductor plates to be broken into smaller bodies along score lines, which comprises pressing a scoring tool by stored force against the plate surface at substantially constant contact pressure of about 50 to 200 grams, and passing the tool under said pressure over the semiconductor surface at substantially constant speed between about 1 and 5 cm. per second.

2. The method of scoring silicon and germanium semiconductor plates for breaking them into smaller bodies along score lines, which comprises attaching the plates in face-to-face relation to a carrier with the exposed plate surfaces substantially in a common plane, passing a scoring tool sequentially along the plates to scratch score lines into the plate surfaces, pressing the tool during its travel against the plates at substantially constant pressure of about 50 to 200 grams while moving the tool at substantially constant speed between about 1 and about 5 cm. per second, lifting the tool during each scoring pass as it passes from one to the next plate within a lifting limit of about 50 microns at the point where the tool reaches the edge of said next plate.

3. The method of scoring silicon and germanium semiconductor plates for breaking them into smaller bodies along score lines, which comprises passing a scoring tool with a plurality of cutting edges in forward and return passes over the respective surfaces of a number of plates while using different cutting edges of the tool for scoring the plates during said respective passes, applying during each scoring pass a substantially constant tool pressure of about 50 to 200 grams, and moving the tool during each pass at substantially constant speed between about 1 and 5 cm. per second.

4. The method of scoring silicon and germanium semiconductor plates for breaking them into smaller bodies along score lines, which comprises attaching the plates in face-to-face relation to a carrier with the exposed plate surfaces substantially in a common plane, passing a scoring tool sequentially along the plates at a substantially constant speed of about 1 to 5 cm. per second and simultaneously applying upon the plates a substantially constant tool pressure of about 50 to 200 grams, reversing the tool travel and displacing the carrier with the attached plates continuously in response to the arrival of the scoring tool at the end of a pass so as to cut parallel scoring traces into the plates during consecutive passes respectively.

5. The method of scoring silicon and germanium semiconductor plates for breaking them into smaller bodies along score lines, which comprises adhesively attaching a plurality of the semiconductor plates side by side upon an adhesive pressure-damping surface of a carrier sheet of yieldable material and securing the plate-carrying sheet by its edges on a rigid supporting surface, passing a scoring tool sequentially along a row of the attached plates at a substantially constant speed of about 1 to 5 cm. per second and simultaneously applying upon the plates a substantially constant tool pressure of about 50 to 200 grams, and displacing the supported sheet after each scoring pass to cut parallel scoring traces into the plates with the yieldable sheet material absorbing the shock forces occurring when the tool, after leaving one plate, runs onto the next plate to be scored.

6. Apparatus for scoring semiconductor plates to be broken into smaller bodies along score lines, comprising support means having a top surface for attachment of a number of semiconductor plates, tool holder means having a scoring tool engageable with the surfaces of the semiconductor plates on said support means for scoring said plates, adjustable force storing means connected with said tool holder means for pressing said tool against said plates with substantially constant pressure of about 50 to 200 grams, said support means and said holder means being displaceable relative to each other in two coordinate directions, a drive connected with one of said two means for displacing it in one of said directions, said drive having a substantially constant speed which is between about 1 and 5 cm. per second between tool and plates, and shifting means for incrementally displacing said support and holder means relative to each other in said other direction, said shifting means being actuated by the tool upon completion of a scoring pass of the tool, whereby parallel lines are successively scored on the surfaces of the semiconductor plates, said support means comprising a foil fastened flat upon said top surface of said support, the semiconductor plates being adhesively attached to said foil, said foil consisting of transparent material, and said top surface having indicator markings to facilitate attaching the semiconductor plates in close alignment with each other.

7. Apparatus for scoring semiconductor plates to be broken into smaller bodies along score lines, comprising a base, a carriage displaceable on said base in a give direction, a support mounted on said carriage and having a planar top surface, said support being positionable to respectively different angular positions relative to said carriage, means on said top surface for attaching thereto rows of semi-conductor plates to be scored, tool holder means displaceably mounted on said base for travel transverse to said direction and having a scoring tool and force-storing means for pressing said tool against the plates, a constant-speed drive connected with said tool holder for moving it across said carriage, said drive comprising reversing means for reversing the tool travel after each pass, shifting means for displacing said carriage comprising a stepping mechanism connected to said carriage for incrementally advancing said carriage after each scoring pass, and control means connected with said stepping mechanism and responsive to reversal of tool travel for displacing said carriage upon completion of respective scoring passes whereby parallel score lines are produced by a sequence of scoring passes and transverse score lines are added after changing the angular position of said support by another sequence of passes.

References Cited by the Examiner

UNITED STATES PATENTS

| | | | |
|---|---|---|---|
| 1,855,078 | 4/1932 | Williamson | 33—32 |
| 2,378,033 | 6/1945 | Pash | 33—32 |
| 2,404,222 | 7/1946 | Doner | 33—18 |
| 2,970,730 | 2/1961 | Schwarz. | |
| 3,054,709 | 9/1962 | Freestone et al. | 29—413 |
| 3,059,337 | 10/1962 | Lynch | 33—32 |
| 3,094,785 | 6/1963 | Kulicke | 33—32 |

HAROLD D. WHITEHEAD, *Primary Examiner.*

JOHN C. CHRISTIE, LESTER M. SWINGLE, *Examiners.*

J. E. PEELE, *Assistant Examiner.*